United States Patent [19]

Driscoll et al.

[11] Patent Number: 5,987,302

[45] Date of Patent: Nov. 16, 1999

[54] ON-LINE ESSAY EVALUATION SYSTEM

[75] Inventors: Gary Driscoll, Pennington; Lou A. Hatfield, Lawrenceville; Arlene A. Johnson, Lawrencevill, all of N.J.; Helen D. Kahn, Yardley, Pa.; Theodore E. Kessler, Hopewell, N.J.; David L. Kuntz, Yardley, Pa.; Cheryl A. Pocino, Lawrenceville, N.J.; Michele Rosenthal, Lawrenceville, N.J.; Patricia G. Williams, Lawrenceville, N.J.

[73] Assignee: Educational Testing Service, Princeton, N.J.

[21] Appl. No.: 09/045,622

[22] Filed: Mar. 20, 1998

Related U.S. Application Data

[60] Provisional application No. 60/039,383, Mar. 21, 1997, and provisional application No. 60/071,893, Jan. 20, 1998.

[51] Int. Cl.$^6$ .................................. G09B 3/00; G09B 7/00
[52] U.S. Cl. ........................... 434/353; 434/118; 434/322; 434/350; 382/321
[58] Field of Search .................................... 434/118, 156, 434/157, 169, 307 R, 308, 322, 323, 327, 347, 350, 353, 365; 704/10; 358/450; 706/45, 927; 707/104, 500, 501, 512, 100, 102; 382/10, 48, 321; 273/429–432; 345/302, 348

[56] References Cited

U.S. PATENT DOCUMENTS

| | | |
|---|---|---|
| 4,671,772 | 6/1987 | Slade et al. . |
| 4,768,087 | 8/1988 | Taub et al. . |
| 4,867,685 | 9/1989 | Brush et al. . |
| 4,895,518 | 1/1990 | Arnold et al. . |
| 4,953,209 | 8/1990 | Ryder, Sr. et al. . |
| 4,958,284 | 9/1990 | Bishop et al. ........................... 434/353 |
| 4,978,305 | 12/1990 | Kraft . |
| 5,002,491 | 3/1991 | Abrahamson et al. . |
| 5,011,413 | 4/1991 | Ferris et al. . |
| 5,033,969 | 7/1991 | Kamimura . |
| 5,059,127 | 10/1991 | Lewis et al. . |
| 5,170,362 | 12/1992 | Greenberg et al. . |
| 5,176,520 | 1/1993 | Hamilton . |
| 5,180,309 | 1/1993 | Egnor . |
| 5,195,033 | 3/1993 | Samph et al. . |
| 5,204,813 | 4/1993 | Samph et al. . |
| 5,211,563 | 5/1993 | Haga et al. . |
| 5,211,564 | 5/1993 | Martinez et al. . |
| 5,247,670 | 9/1993 | Matsunage . |
| 5,287,519 | 2/1994 | Dayan et al. . |
| 5,309,564 | 5/1994 | Bradley et al. . |
| 5,318,450 | 6/1994 | Carver . |
| 5,321,611 | 6/1994 | Clark et al. . |
| 5,432,932 | 7/1995 | Chen et al. . |
| 5,433,615 | 7/1995 | Clark . |
| 5,437,554 | 8/1995 | Clark et al. . |
| 5,442,759 | 8/1995 | Chiang et al. . |
| 5,466,159 | 11/1995 | Clark et al. . |
| 5,509,127 | 4/1996 | Datwyler et al. . |
| 5,513,994 | 5/1996 | Kershaw et al. . |
| 5,524,193 | 6/1996 | Covington et al. . |
| 5,558,521 | 9/1996 | Clark et al. . |
| 5,565,316 | 10/1996 | Kershaw . |
| 5,672,060 | 9/1997 | Poor ..................................... 382/321 X |
| 5,772,446 | 6/1998 | Rosen ................................. 434/323 X |
| 5,782,642 | 7/1998 | Goren ................................. 434/350 X |
| 5,788,504 | 8/1998 | Rice et al. ......................... 707/100 X |
| 5,829,983 | 11/1998 | Koyama et al. ................... 434/350 X |

FOREIGN PATENT DOCUMENTS

WO 95/15654   6/1995   WIPO .

OTHER PUBLICATIONS

"The Integrated Instructional Systems Report", Feb., 1990, EPIE Institute.

Results of liturature search re: new products and educational/psychological academic literature performed by Educational Testing Service on Jul. 29, 1992 using various commercial databases.

"The MicroCAT Testing System", 1992 Computerized Testing Products Catalog, Assessment Systems Corporation, 1992.

Wayne Patience, "Software Review–MicroCAT Testing System Version 3.0", Journal of Educational Measurement/Spring 1990, vol. 27, No. 1, pp. 82–88.

G. Gage Kingsbury, "Adapting Adaptive Testing: Using the MicroCAT Testing System in a Local School District", Educational Measurement: Issues and Practice, Summer, 1990, pp. 3–6 and 29.

Anthony DePalma, "Standardized College Exam Is Customized by Computers", The New York Times, Front Page Story, Mar. 21, 1992.

ETS/ACCESS Summer 1992 Special Edition Newsletter.

Elliot Solway, "Quick, Where Do the Computers Go; Computers in Education", Communications of the AMC, Association for Computing, Machinery, 1991, Feb., 1991, vol. 34, No. 2, p. 29.

Tse–chi Hsu and Shula F. Sadock, "Computer–Assisted Test Construction: A State of the Art", TME Report 88, Educational Testing Service, Nov. 1985.

Abdel–fattah, "Comparison of the Chi–Square Procedure with the Symmetric Regression Procedure for Developing a Common Metric in Item Response Theory", 1992, Abstract.

Adams et al., "Quest: The Interactive Test Analysis System", 1993, Abstract.

Burstein et al., "GE FRST Evaluation Report: How Well Does a Statistically–Based Natural Language Processing System Score Natural Language Constructed–Responses?", 1995, Abstract.

de la Torre et al., "The Development and Evaluation of a Computerized Adaptive Testing System", 1991, Abstract.

Gearhart et al., "Writing Portfolios at the Elementary Level: A Study of Methods for Writing Assessment", 1992, Abstract.

Halpin et al., "So You Have Chosen an Unequal Cell Size ANOVA Option—Do you Really Know What you Have?", 1991, Abstract.

Henning et al., "Automated Assembly of Pre–equated Language Proficiency Tests", *Language Testing*, 1994, 11, Abstract.

Kaplan et al., "Using the Free–Response Scoring Tool to Automatically Score the Formulating–Hypotheses Item", 1994, Abstract.

Sebrechts et al., "Agreement between Expert System and Human Raters' Scores on Complex Constructed–Response Quantitative Items", 1991, Abstract.

Smittle, "Computerized Adaptive Testing: Revolutionizing Academic Assessment", *Community College J.*, 1994, 65, Abstract.

Solomon et al., "A Pilot Study of the Relationship between Experts' Ratings and Scores Generated by the NBME's Computer–Based Examination System", *Acad. Med.*, 1992, 67, Abstract.

Stowitschek et al., "A Computerized Risk Index Screening Program for At–Risk Students", 1990, Abstract.

Wang, "An Analytical Approach to Generating Norms for Skewed Normative Distributions", 1992, Abstract.

Weiss et al., "User's Manual for the Basic Math Mastery Tests", 1992, Abstract.

*Primary Examiner*—Joe H. Cheng
*Attorney, Agent, or Firm*—Woodcock Washburn Kurtz Mackiewicz & Norris LLP

[57] ABSTRACT

Systems and methods for on-line essay evaluation offer students the opportunity to prepare practice essays, submit the essays to trained, expert readers, and retrieve an evaluation at the student's convenience. The system provides the capability for a user or test taker to submit essays at any time during the year, independent of the timing of an actual testing event, and to receive prompt, consistent evaluations of the submitted essays. Further, the system provides the capability to prioritize essays and schedule readers so that essays can be evaluated on a rush basis. The essays are evaluated in a manner that provides useful instructional feedback to students about their skills relative to any assessment or test that the student wishes to take.

15 Claims, 29 Drawing Sheets

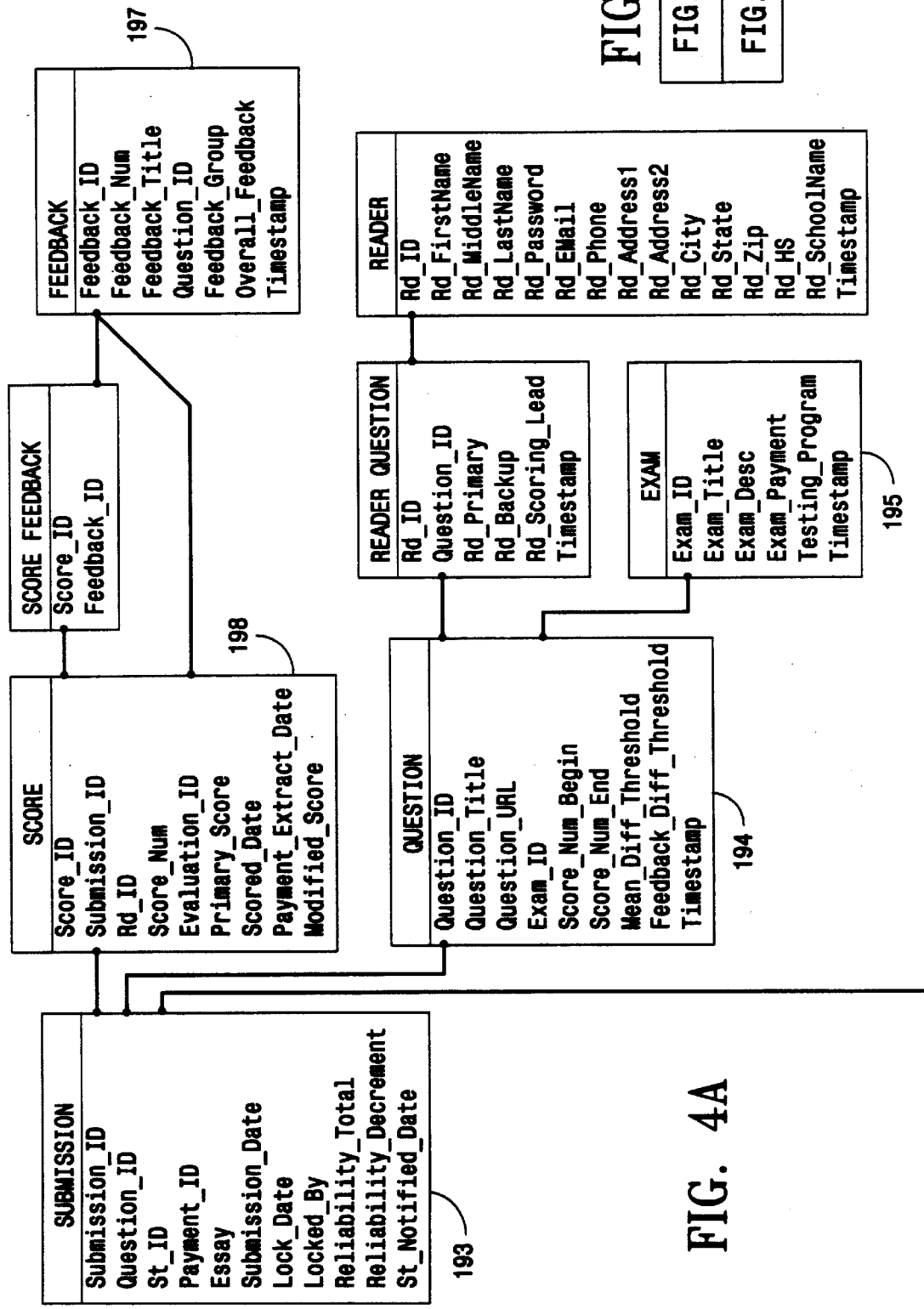

SAT II: Writing

Directions —— 230
Fees ———— 231
Samples ———— 232
Pick a Topic —— 233
Order ———— 234
Write ———— 235
Submit ———— 236
Get Evaluation —— 237
FAQs ———— 238
Help ———— 239

Return to Start

College Board
Online
Site Search

SAT II: Writing

The Online Essay Evaluation Service works best with Netscape 2.0 or better and Microsoft Internet Explorer 3.0 or better. To download the latest browser version, select the appropriate button.

 

Get ready for SAT II: Writing Test questions with the Online Essay Evaluation Service. You'll have a chance to try real test questions and to get valuable feedback to help you prepare for the actual test day.

Here are some of the reasons the Online Essay Evaluation Service will help you do your best when you sit down to take an SAT II: Writing Test:

- Real Questions: The service provides you with the only online opportunity to prepare for the SAT II: Writing Test using actual questions from recent tests.
- Valuable Feedback: You get useful, instructive feedback to help you improve your essay as you prepare for test day.
- Experience: Because you are practicing on questions written by SAT test developers and receiving evaluations from the readers of the actual exams, you'll learn what to expect and how to prepare for test day.

What You Receive

Within five business days, your personal essay evaluation will become available to you on this web site. Your evaluation will include:

- a copy of the guidelines used to score your essay;
- one or more model essays written by successful test takers, along with reader's commentary;
- helpful feedback on the strengths and weaknesses of your essay; and
- an overall evaluation.

The evaluation you will receive is not a predictor of any future performance on the SAT II: Writing Test. Additionally, to ensure the fairness of scoring, and to evaluate and improve this service, your practice essay, without your identifying information, may also be used for research purposes.

Directions

Information on the SAT II Writing Test

---

*This entire site protected by copyright. All rights reserved. By accessing and using this site, you agree to be subject to the "Terms and Conditions Governing Use and Access to College Board Online."*

FIGURE 7

 # Online Essay Evaluation Service 

SAT II: Writing

Directions
Fees
Samples
Pick a Topic
Order
Write
Submit
Get Evaluation
FAQs
Help Return to Start College Board Online
Site Search

SAT II: Writing
Directions

1. Sample: Take a look at sample topics with sample student essays and evaluations.
2. Pick a Topic: Preview (before paying for anything) questions that you want to answer and have evaluated by trained readers.
3. Print the test question(s) you will answer.
4. Order: Receive an access code for each question you select. Students must have a major credit card: VISA, MasterCard, or American Express. Schools must have a credit card or purchase order.
5. You will receive your access code(s) on the web site immediately after completing the order form.
6. Print and keep a copy of your access code(s).
7. Write: Prepare your essay under conditions similar to the real test experience.
8. Submit: Use your access code(s) to send your essay in for review.
9. Get Evaluation: Return to the web site within five days after submission to get your evaluation. You will need your access code.
10. FAQ: If you have questions, review frequently asked questions.
11. Help: If you need additional assistance, select Help.

Fees

---

*This entire site protected by copyright. All rights reserved. By accessing and using this site, you agree to be subject to the "Terms and Conditions Governing Use and Access to College Board Online."*

FIGURE 8

 

Online Essay Evaluation Service

SAT II: Writing

Directions
Fees
Samples
Pick a Topic
Order
Write
Submit
Get Evaluation
FAQs
Help Return to Start College Board Online
Site Search

SAT II: Writing
Fees

Students and schools can use the Online Essay Evaluation Service. To purchase, students need a VISA, MasterCard, or American Express card. Schools can use a purchase order or a credit card.

Students may purchase SAT II: Writing essays in two ways:

- one practice essay at a time for $10 per essay
- three practice essays at a time for $25 total Schools can order multiple practice essays as listed (or in multiples of these quantities):

- ten practice essays at a time for $85 total
- thirty practice essays at a time for $255 total
- fifty practice essays at a time for $400 total
- one hundred practice essays at a time for $800 total Once you complete the order form you will immediately receive an access code on this web site for each evaluation you ordered. You may use an access code to submit a response to any of the available SAT II: Writing questions.

Access codes are good for one-time use, for one year.

After writing and submitting your essay, your personal evaluation will be available on this web site within five working days.

Rush order: You may also choose to have your evaluation(s) rushed back to you within two business days for an extra $12.50 per essay.

To Order

Sample SAT II: Writing question, essays, and evaluations

---

*This entire site protected by copyright. All rights reserved. By accessing and using this site, you agree to be subject to the "Terms and Conditions Governing Use and Access to College Board Online."*

FIGURE 9

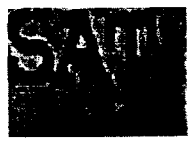 # Online Essay Evaluation Service 

SAT II: Writing

Directions
Fees
Samples
Pick a Topic
Order
Write
Submit
Get Evaluation
FAQs
Help Return to Start College Board Online
Site Search

SAT II: Writing
Samples of What You Receive

Below are samples of what they receive once their SAT II: Writing essay has been evaluated:

- The question to which they responded
- Their sample essay
- Their essay evaluation
- The Scoring Guide used by readers
- Sample model essays, "excellent" and "good"

Pick a Topic

---

*This entire site protected by copyright. All rights reserved. By accessing and using this site, you agree to be subject to the "Terms and Conditions Governing Use and Access to College Board Online."*

FIGURE 10

 # Online Essay Evaluation Service 

SAT II: Writing

Directions
Fees
Samples
Pick a Topic
Order
Write
Submit
Get Evaluation
FAQs
Help Return to Start College Board
Online
Site Search

SAT II: Writing
Pick a Topic

Preview the topics listed below before choosing the essay(s) you would like to write. When you have chosen a topic, print out the relevant pages and then do your writing. This service lets you write on any essay topic before you actually pay for the evaluation.

Available Topics

- Reputations
- New Ideas
- A Significant Event
- Dramatic Results
- On the Shoulders of Giants

Order

---

*This entire site protected by copyright. All rights reserved. By accessing and using this site, you agree to be subject to the "Terms and Conditions Governing Use and Access to College Board Online."*

FIGURE 11

 Online Essay Evaluation Service 

SAT II: Writing

Directions
Fees
Samples
Pick a Topic
Order
Write
Submit
Get Evaluation
FAQs
Help Return to Start College Board Online
Site Search

SAT II: Writing Order

Place your order for the Online Essay Evaluation Service. You will receive one access code for each evaluation you order. Access codes are required to submit essays.

Students must have a major credit card: VISA, MasterCard, or American Express.

Schools must have a credit card or purchase order.

For information on the fees for this service, see:

SAT II: Writing Fees

*This entire site protected by copyright. All rights reserved. By accessing and using this site, you agree to be subject to the "Terms and Conditions Governing Use and Access to College Board Online."*

FIGURE 12

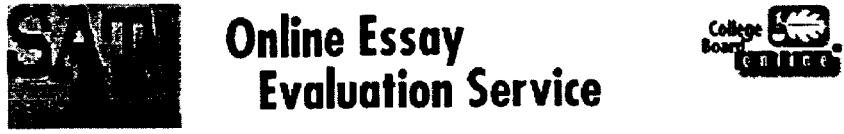
Online Essay Evaluation Service

SAT II: Writing

Directions
Fees
Samples
Pick a Topic
Order
Write
Submit
Get Evaluation
FAQs
Help Return to Start College Board
Online
Site Search

SAT II: Writing
How to Write Your Essay

Option #1 By Hand -- In order to best prepare for the SAT II: Writing Test, we recommend writing your essay under normal exam-like conditions. Use a pen and paper and handwrite your essay, observing the time limits for planning and writing. Then, you can type your essay on a computer using a standard word processing program, save it, and copy and paste it into the Submit page of this web site.

Option #2 By Computer or Word Processor -- If you prefer, you can type your essay on a computer using a standard word processing program, save it, and copy and paste it into the Submit page. Remember, you won't be able to type your essay during the actual exam!

Option #3 Directly Online -- You can also type your essay directly onto the Submit Essay web page, but we do not recommend it. If your web access is interrupted, you may lose your essay and have to recreate your answer. A very frustrating process!

When writing your evaluation essay, follow these tips to become better prepared for the SAT II: Writing Test:

1. Whether you decide to handwrite your essay first or just type it, be sure to save your essay on the computer, and save it often, in the event of any problems.
2. For the most authentic evaluation, do not use the grammar and spelling check option on your word processing program. You won't be able to use one during the test.
3. Remember that in order to receive the most helpful feedback you should compose your essay under exam-like conditions, observing the specified time constraints for planning and writing.

Use your browser's back button to return to a topic or select from the menu at left.

---

*This entire site protected by copyright. All rights reserved. By accessing and using this site, you agree to be subject to the "Terms and Conditions Governing Use and Access to College Board Online."*

FIGURE 13

Online Essay Evaluation Service

SAT II: Writing

Directions
Fees
Samples
Pick a Topic
Order
Write
Submit
Get Evaluation
FAQs
Help Return to Start College Board Online
Site Search

Submitting Your Essay

Please select the essay you are submitting. Then complete the information below.

*AP Biology*
    Properties of Water
    Animal Systems Structure and Function
    Laboratory Question: Plant Growth
    Mitosis/Meiosis
    Recycling of Oxygen
    Regulatory Mechanisms
    Laboratory Question: Animal Behavior
    Laboratory Question: Genetics and Hardy-Weinberg

*AP English Language and Composition*
    Lady Montagu
    Gary Soto's Autobiographical Narrative
    Lewis Lapham's Money and Class in America
    Meena Alexander's Fault Lines
    Frederick Douglass
    1984 and Brave New World

*AP English Literature and Composition*
    The House of the Seven Gables
    Anne Bradstreet Poem
    Open Essay Question on Happy Endings
    On The "Death of a Toad" Poem
    Obasan
    Open Essay on Social Occasions

*AP U. S. History*
    American Revolution
    Articles of Confederation
    Jacksonian Democracy
    Territorial Expansion
    Reconstruction Document Based Question
    Consequences of the Civil War
    Women, 1890-1925 Document Based Question
    McCarthyism

*SAT II Writing*
    Reputations
    New Ideas
    A Significant Event
    Dramatic Result
    On the Shoulders of Giants

Identification Information

FIGURE 14

Online Essay
Evaluation Service

SAT II: Writing

Directions
Fees
Samples
Pick a Topic
Order
Write
Submit
Get Evaluation
FAQs
Help Return to Start College Board Online
Site Search

Get Your Feedback

Please enter your Access Code:

Access Code:

*This entire site protected by copyright. All rights reserved. By accessing and using this site, you agree to be subject to the "Terms and Conditions Governing Use and Access to College Board Online."*

FIGURE 15

 # Online Essay Evaluation Service 

SAT II: Writing

Directions
Fees
Samples
Pick a Topic
Order
Write
Submit
Get Evaluation
FAQs
Help Return to Start College Board
Online
Site Search

SAT QUESTIONS

Q. When should I plan to write a SAT II: Writing Test practice essay?

A. Depending on when you plan to take the actual test, it would be most useful to try the Online Essay Evaluation Service when you can use the feedback you receive to improve your writing and performance on the test. If you plan to test in the spring, you may want to try the service early in the school year. This gives you plenty of time to review your evaluation and to work on your weaknesses before you take the actual tests.

Q. Is there a limit to how many times I can write and submit the same essay for evaluation?

A. No.

Q. Does the College Board recommend writing the same SAT II: Writing Test practice essay more than once?

A. It might be helpful to write the same essay twice to find out if you improved your previously evaluated weak areas. However, since you won't have the opportunity to write the same essay on the actual test or examination, it may be more helpful to take two comparative essays.

Q. Is there a deadline for submitting an essay once I've ordered and received the access code?

A. Yes, you must submit the essay within one year after purchasing the practice essay.

Q. When will my evaluation be ready after it's submitted?

A. Your evaluation should be available within five business days. However, because the evaluations are released as soon as they are completed, you may want to check the site after three or four days.

Q. Who should take the SAT II: Writing Test?

A. Some colleges require SAT II: Subject Tests for admission. Colleges use the tests to help determine how well prepared you are for different college programs, place you in freshman and higher-level course work, and advise you on course selections. Subject Test scores can help you demonstrate your achievements. Check directly with the

FIGURE 16

 Online Essay Evaluation Service 

SAT II: Writing

Directions
Fees
Samples
Pick a Topic
Order
Write
Submit
Get Evaluation
FAQs
Help Return to Start College Board Online
Site Search

SAT II: Writing

Try FAQs for answers to questions on the SAT II: Writing part of the service. If these responses do not help, email us at ONLINE-ESSAY@ets.org so we can help you.

---

*This entire site protected by copyright. All rights reserved. By accessing and using this site, you agree to be subject to the "Terms and Conditions Governing Use and Access to College Board Online."*

FIGURE 17

Hello, thisis production, Welcome to the Reader Scoring Site.

AP Biology | AP English Language and Composition |
AP English Literature and Composition | AP U. S. History | SAT II Writing | HELP

AP Biology

| | |
|---|---|
| Properties of Water |  |
| Animal Systems Structure and Function |  |
| Laboratory Question: Plant Growth |  |
| Mitosis/Meiosis |  |
| Recycling of Oxygen |  |
| Regulatory Mechanisms |  |
| Laboratory Question: Animal Behavior |  |
| Laboratory Question: Genetics and Hardy-Weinberg |  |

AP English Language and Composition

| | |
|---|---|
| Lady Montagu |  |
| Gary Soto's Autobiographical Narrative |  |
| Lewis Lapham's Money and Class in America |  |
| Meena Alexander's Fault Lines |  |
| Frederick Douglass |  |
| 1984 and Brave New World |  |

AP English Literature and Composition

| | |
|---|---|
| The House of the Seven Gables |  |
| Anne Bradstreet Poem |  |
| Open Essay Question on Happy Endings |  |
| On The "Death of a Toad" Poem |  |
| Obasan |  |

FIGURE 22

AP 1996 English Language Question 1 Training Pack

This training pack contains a copy of the <u>question</u> you are reading, the <u>scoring guide</u> used at the reading, and sample papers at score points <u>1, 2, 3, 4, 5, 6, 7, 8, and 9.</u>

---

AP English Language Question 1

In the following passage from a letter to her daughter, Lady Mary Wortley Montagu (1689-1762) discusses the education of her granddaughter.

Read the passage carefully. Then write an essay in which you analyze how Lady Mary uses rhetorical strategies and stylistic devices to convey her views about the role knowledge played in the lives of women of her time.

> True knowledge consists in knowing things, not words. I would wish her no further a linguist than to enable her to read books in their originals, that are often corrupted, and always injured, by translations. Two hours' application every morning will bring this about much sooner than you can imagine, and she will have leisure enough besides to run over the English poetry, which is a more important part of a woman's education than it is generally supposed. Many a young damsel has been ruined by a fine copy of verses, which she would have laughed at if she had known it had been stolen from Mr. Waller. I remember, when I was a girl, I saved one of my companions from destruction, who communicated to me an epistle she was quite charmed with. As she had a natural good taste, she observed the lines were not so smooth as Prior's or Pope's, but had more thought and spirit than any of theirs. She was wonderfully delighted with such a demonstration of her lover's sense and passion, and not a little pleased with her own charms, that had force enough to inspire such elegancies. In the midst of this triumph I showed her that they were taken from Randolph's poems, and the unfortunate transcriber was dismissed with the scorn he deserved. To say truth, the poor plagiary was very unlucky to fall into my hands; that author being no longer in fashion, would have escaped any one of less universal reading than myself. You should encourage your daughter to talk over with you what she reads; and, as you are very capable of distinguishing, take care she does not mistake pert folly for wit and humour, or rhyme for poetry, which are the common errors of young people, and have a train of ill consequences. The second caution to be given her (and which is most absolutely necessary) is to conceal whatever learning she attains with solicitude . . . ; the parade of it can only serve to draw on her the envy, and consequently the most inveterate hatred, of all he and she fools, which will certainly be at least three parts in four of all her acquaintance. The use of knowledge in our sex, besides the amusement of solitude, is to

AP English Language Question 1

In the following passage from a letter to her daughter, Lady Mary Wortley Montagu (1689-1762) discusses the education of her granddaughter.

Read the passage carefully. Then write an essay in which you analyze how Lady Mary uses rhetorical strategies and stylistic devices to convey her views about the role knowledge played in the lives of women of her time.

> True knowledge consists in knowing things, not words. I would wish her no further a linguist than to enable her to read books in their originals, that are often corrupted, and always injured, by translations. Two hours' application every morning will bring this about much sooner than you can imagine, and she will have leisure enough besides to run over the English poetry, which is a more important part of a woman's education than it is generally supposed. Many a young damsel has been ruined by a fine copy of verses, which she would have laughed at if she had known it had been stolen from Mr. Waller. I remember, when I was a girl, I saved one of my companions from destruction, who communicated to me an epistle she was quite charmed with. As she had a natural good taste, she observed the lines were not so smooth as Prior's or Pope's, but had more thought and spirit than any of theirs. She was wonderfully delighted with such a demonstration of her lover's sense and passion, and not a little pleased with her own charms, that had force enough to inspire such elegancies. In the midst of this triumph I showed her that they were taken from Randolph's poems, and the unfortunate transcriber was dismissed with the scorn he deserved. To say truth, the poor plagiary was very unlucky to fall into my hands; that author being no longer in fashion, would have escaped any one of less universal reading than myself. You should encourage your daughter to talk over with you what she reads; and, as you are very capable of distinguishing, take care she does not mistake pert folly for wit and humour, or rhyme for poetry, which are the common errors of young people, and have a train of ill consequences. The second caution to be given her (and which is most absolutely necessary) is to conceal whatever learning she attains with solicitude . . . ; the parade of it can only serve to draw on her the envy, and consequently the most inveterate hatred, of all he and she fools, which will certainly be at least three parts in four of all her acquaintance. The use of knowledge in our sex, besides the amusement of solitude, is to moderate the passions, and learn to be contented with a small expense, which are the certain effects of a studious life; and it may be preferable even to that fame which men have engrossed to themselves, and will not suffer us to share.

Scoring Guide
AP English Language Question 1

*General Directions:* This scoring guide will be useful for most of the essays you read. When it seems inappropriate for a particular essay, consult your Table Leader. Also consult your Table Leader about books that seem to have no response or responses unrelated to the question (scored-).

The score you assign each essay should reflect your judgment of its quality as a whole. You should reward the writers for what they do well in response to the question. Remember that students had 40 minutes to read and write. The resulting essays should thus be thought of as comparable to essays produced in final exams, not judged by standards appropriate for out-of-class writing assignments.

All essays, even those scored 8 and 9, are likely to exhibit occasional flaws in analysis or in prose style and mechanics; such lapses should enter into your holistic judgment of the essay's quality. In no case, however, may an essay with many distracting errors in grammar and mechanics be scored higher than 2.

9: Essays earning a score of 9 meet all the criteria for 8 papers and, in addition, are particularly full or apt in their analysis or demonstrate particularly impressive stylistic control.

8: Essays earning a score of 8 effectively analyze how rhetorical strategies and stylistic devices help Lady Montagu convey her views about the role knowledge played in women's lives. They refer to the text, directly or indirectly, and are likely to cogently describe how strategies such as tone, irony, and use of examples contribute to the passage. Their prose demonstrates an ability to control a wide range of the elements of effective writing but is not necessarily flawless.

7: Essays earning a score of 7 fit the descriptions of 6 essays but employ more complete analysis or more mature prose style.

6: Essays earning a score of 6 adequately analyze how rhetorical strategies and stylistic devices help Lady Montagu convey her views about the role of knowledge in women's lives. They refer to the text, directly or indirectly, and they may discuss or implicitly recognize features and devices such as irony, tone, and use of example as ways of demonstrating these views. A few lapses in diction or syntax may be present, but generally the prose of 6 essays conveys their writers' ideas clearly.

5: Essays earning a score of 5 analyze rhetorical strategies used by Lady Montagu to convey her views about the role of knowledge in women's lives, but their development of those strategies is limited. They may treat strategies in superficial ways or develop their ideas inconsistently. A few lapses in diction or syntax may be present, but usually the prose in 5 essays conveys

FIGURE 25

Sample Essays

Essay TTT, Score=9

In all great works of fiction, it is one of the author's major responsibilities to establish definite characteristics and shades to each character; how this is done is solely based on the author's creative perception. In his novel *The House of the Seven Gables*, Nathaniel Hawthorne utilizes an indirect description of the character of Judge Pyncheon to reveal his characteristics and personalities. Mainly through the usage of *tone* and *point of view*, Hawthorne reveals Judge Pyncheon as a proud, hypocritical, self-righteous, and generally reprehensible individual.

Overpowering the entire passage is Hawthorne's heavy, sardonic tone. From the outset, the narrator lavishes praise on Pyncheon's "purity of judicial character," "cleanliness of moral deportment," and "faithfulness of public service." Yet this is done at such an extent that this praise is rendered overblown and

FIGURE 26

☒1. ☐2. ☒3. ☐4. ☐5. ☒6. ☒7. ☒8. ☐9. ☐10. ☐11. ☐12. ☐13. ☐14. ☐15. ☐16. ☐17. ☐18. ☐19. ☐20.
☐21. ☐22. ☐23. ☐24. ☐25. ☐26. ☐27.
Overall Evaluation: ●28. ○29. ○30. ○31. ○32.  Overall Score: ○_ ○0 ○1 ○2 ○3 ○4 ○5 ○6 ○7 ○8 ●9

| Submit/Quit | Submit/Continue | Reset | Return Unscored | Description | Training Pack | http://cbweb6.collegebo...submission_ID=883MHLVM63   http://cbweb6.collegeboard.org/rea...essay.htm?Submission_ID=883MH AP English Literature and Composition - The House of Seven Gables
Access_code:883MHLVM63

In this passage written by Nathaniel Hawthorne, the narrator is describing the character of Judge Pyncheon. The narrator uses syntax and selection of detail quite well while revealing the Judge's character to the reader. The judge is first portrayed as an outstanding and bright citizen of the community, who might have committed one controversial act in his past.
In the first paragraph, syntax plays a key role in developing the Judge's character. The first paragraph is forty-one lines long yet it only contains six sentences, one of which is thirty-one lines long. The long run on sentence is the one in which the narrator lists some of the judge's good deeds and accomplishments. This sentence seems to ramble on and on, giving the reader the impression the Judge Pyncheon's list of good deeds goes on for longer that it actually does.

FIG. 27

**AP English Literature and Composition - The House of the Seven Gables
Description**

*Warning: In order to transfer any selected feedback, you must use the OK button to return to the student essay.*

---

9-8

☐ 1. You provide a clear analysis of Judge Pyncheon's character, with apt and specific references to the text.

☐ 2. Your essay is well-developed.

☐ 3. Your essay is well-organized.

☐ 4. Your ideas are perceptive and demonstrate an understanding of the text.

☐ 5. The essay acknowledges and addresses the complexity of Pyncheon's character.

☐ 6. Your essay discusses several literary devices that help to create Pyncheon's character.

☐ 7. You demonstrate consistent control over the elements of effective composition.

☐ 8. The essay contains only minor grammatical, mechanical, or usage errors that do not detract from the overall impression. Nonetheless, you should save a little time to reread your AP essays after you write them.

---

7-6

☐ 9. You provide a generally clear analysis of Judge Pyncheon's character with some apt support from the text. More thorough support would strengthen the essay.

☐ 10. Your essay is accurate in discussing the literary techniques that bring Judge Pyncheon's complex character to life. Reread the passage and look for additional clues to Pyncheon's complexity.

☐ 11. Your essay is clear. If you are able to make it more incisive and precise, it will score even higher.

☐ 12. You demonstrate generally consistent control over the elements of effective composition. Practice in writing should help you gain even more control.

☐ 13. The essay contains minor grammatical, mechanical, or usage errors that only occasionally detract from the overall impression. Nonetheless, eliminating these errors will improve your score. Save a little time to reread your AP essays after you write them.

---

5

☐ 14. While you analyze the character of Judge Pyncheon, your essay would be improved with more specific references and more fluid development.

☐ 15. You recognize that the narrator does not approve of Pyncheon, but the essay does not capture the complexity of the character. Consider the narrator's use of irony and how the narrator conveys certain contradictions.

☐ 16. You offer an analysis of how literary devices are used in the characterization. The essay would be stronger if the analysis were more penetrating.

FIGURE 28

ON-LINE ESSAY EVALUATION SYSTEM

CROSS REFERENCE TO RELATED APPLICATIONS

This application is related to U.S. Provisional patent application Ser. No. 60/039,383, filed Mar. 21, 1997, entitled "On-Line Essay Evaluation System," and U.S. Provisional patent application Ser. No. 60/071,893, filed Jan. 20, 1998, entitled "On-Line Essay Evaluation System," the contents of which are hereby incorporated by reference in their entirety.

FIELD OF THE INVENTION

The present invention relates to systems for on-line evaluation of essay responses to examination questions. More specifically, the invention relates to a system for the submission of essays to experienced readers/graders for evaluation and for providing consistent, instructional feedback to students.

BACKGROUND OF THE INVENTION

The use of standardized testing has increased significantly in recent years. Indeed, standardized tests are now an essential part of almost every admission or qualification procedure. A recent trend in standardized testing emphasizes a move beyond traditional multiple choice tests in favor of tests that require open-ended responses such as essay responses. These open-ended responses are often referred to as constructed responses (CRs). CRs are not limited to written text, but may include graphics, videotaped performances, audio responses, as well as other forms of responses. In order to improve the efficiency of scoring large scale standardized tests, both those offered at periodic administrations as well as those offered essentially on a daily basis, computer systems have been developed to automatically score multiple-choice responses and other simple response types. While some automatic scoring systems have been designed to score particular types of CRs (see e.g., U.S. patent application Ser. No. 08/794,498, entitled Automatic Scoring for Categorized Figural Responses, assigned to the same assignee hereunder), the evaluation of CRs is particularly well-suited to human raters. For this reason, certain computer scoring systems have been developed to facilitate and automate the electronic transmission of CRs to human raters for evaluation and scoring. However, these conventional CR transmission systems currently have many disadvantages.

Generally, essay evaluation systems operate in the context of a particular test administration. The systems are used to collect, distribute, and grade actual test responses for a particular test. There is not presently available a system which provides the capability of practicing test taking skills, demonstrating content mastery, and receiving constructive feedback from qualified faculty who have scored actual test responses. Such a system would have tremendous benefits for those persons interested in improving essay writing scores and those preparing for tests. Thus, there is a need for a system that allows persons to improve testing skills by formulating responses to actual test questions in a practice setting and having their responses evaluated by actual test evaluators.

Current evaluation systems also lack an adequate means for scheduling readers/graders. For a system which can accept large numbers of constructed responses, a large number of readers are required to evaluate the constructed responses. Such a system should track when readers are scheduled to be on the system and if scheduled readers do not log on or grade a sufficient number of essays, to notify backup readers.

Some prior systems permanently associate multiple essays or constructed responses with a particular evaluator or reader. The constructed responses remain associated with the reader regardless of whether the reader is logged onto the system. In such systems, when the reader is not logged-in, the constructed responses sit idle waiting for the reader to evaluate the response. A constructed response may wait in a reader's queue for several days before the reader evaluates the response. Under such a system it is not possible to control when a constructed response may be evaluated. Thus, there is a need in the art for a system for evaluating constructed responses that provides automated work load leveling of queued essay responses so that essay responses are evaluated and returned to the submitter or student within a predetermined time.

A further shortcoming of prior systems is the inability to prioritize constructed responses for grading. There is not presently available a means to expedite grading of particular constructed responses. Further, current systems do not account for such prioritization markings in the routing of constructed response to readers so that the desired deadlines are satisfied. Thus, there is a need in the art for a system which allows users to prioritize their essays and which automatically routes essays to evaluators so that the desired dates for evaluation are met.

Another shortcoming in the art is the inability to automatically determine reader compensation based on work performed. Typically, in prior systems, a reader or evaluator is paid a flat fee for participation in a particular scoring project. In an optimal system, a reader's compensation is based upon the reader's work product, i.e., the number of constructed responses that were graded. Further, in an optimal system, the compensation might vary between questions. Thus, there is a need for a system which provides a means for calculating compensation based on the work actually performed by the reader.

An additional shortcoming in present systems is the inability to monitor reader evaluations so as to ensure consistency and quality in scoring. Without such a mechanism, scoring is random and greatly diminishes the usefulness of the system to a student who needs consistent scoring in order to measure improvement. Thus, there is a need for a system whereby reader evaluations are monitored so as to insure quality and consistency in grading.

Still a further shortcoming in present systems is the inadequate feedback that is provided to a student or user who has submitted an essay. Specifically, present systems lack the capability to provide consistent essay feedback from multiple readers and fail to provide students with samples of previously graded essay responses. Typically, in present grading systems, a single numerical score is assigned to a constructed response. In such systems, the user receives no feedback other than an overall score. Further, in those systems that provide additional feedback other than an overall score, the responses are not consistent and non-standardized between readers; generally, the feedback comprises free-hand comments by the reader. The lack of consistent feedback diminishes significantly the benefit of the scoring system to the user or test-taker. Additionally, present systems do not provide the user with samples of scored essays for the same question. Thus, there is a need in the art for a scoring system that provides consistent feedback and sample essay responses.

SUMMARY OF THE INVENTION

Methods and systems for on-line essay evaluation in accordance with the present invention addresses the above described and other shortcomings in the art. According to one aspect of the invention there is provided a method for on-line evaluation of a constructed response to an examination question. The method comprises the following steps: accessing a web site via the Internet, ordering an evaluation account, and selecting an examination question; an examinee constructing an essay response to the examination question; electronically submitting the essay response to the web site for evaluation; positioning the submitted essay response in a queue of essay responses that need to be evaluated by a grader, the essay being placed in the queue based upon at least one of the time of submission of the essay response and the date an evaluation of the essay response is due to the examinee; the grader evaluating the essay response in accordance with calibrated grading guidelines, selecting an overall evaluation, one or more pre-defined feedback comments, and a score; and releasing for retrieval by the examinee the overall evaluation and the pre-defined feedback comments regarding the essay response.

According to another aspect of the invention there is provided an on-line essay evaluation system for submitting essay responses for evaluation by graders and retrieving an evaluation of the essay response from the grader for submission to the examinee. The system comprises the following items: a database which stores a plurality of questions which elicit essay responses from an examinee; an essay response submission system which selects a question from the database and which submits an essay response to the selected question; an essay response administrative system which stores essay responses from a plurality of examinees in a queue and selectively distributes the queued essay responses to graders for evaluation; an automated grading system which enables a grader to evaluate an essay response, to select an overall evaluation, one or more pre-defined additional comments, and a score; and an evaluation delivery system which releases to the examinee for the examinee's retrieval the overall evaluation and any pre-defined additional comments from the grader.

The essay response administrative system schedules graders to evaluate queued essay responses so that essay responses are evaluated and feedback is stored and released for retrieval by the examinee within a predetermined time period. The essay response administrative system includes software which performs the following operations: identifies the number of essay responses which need to be evaluated in an upcoming time period; identifies the number of essay responses which are scheduled to be evaluated in the upcoming time period; if the number of essay responses that need to be evaluated in the upcoming time period is less than the number of essay responses that are scheduled to be evaluated in the upcoming time period, identifies the number of essay responses which need to be evaluated in the upcoming time period; and if the number of essay responses that need to be evaluated in the upcoming time period is greater than the number of essays that are scheduled to be evaluated in the upcoming time period, electronically notifies backup graders of the need to provide assistance in the upcoming time period.

The essay response administrative system prioritizes the presentation and distribution of essay responses to graders so that essay responses are evaluated and feedback is stored and released for retrieval by examinees within a predetermined time period. The essay response administrative system includes software which performs the following operations: identifies the date and time an essay response was submitted; identifies whether the essay response is to be graded on a regular schedule or a rush schedule; calculates a date for which an evaluation of the essay response is due based upon the date the essay response was submitted and whether the essay response is to be evaluated on a regular schedule or a rush schedule; and places the essay response in a queue of essay responses that is ordered by the date on which an evaluation of each response is due.

The essay response administrative system automatically calculates any compensation for the graders based upon the number of constructed responses the grader has evaluated. The essay response administrative system includes software which performs the following operations: identifies a grader; identifies the total number of essay responses read by the grader; and calculates the compensation for the grader as function of the number of essay responses read.

The essay response administrative system includes software which performs the following operations: identifies that a grader has submitted an overall evaluation and score for an essay response; forwards the essay response and overall evaluation to a grader leader for review; and if the overall evaluation and score are not consistent with scoring and evaluation standards, allows grader leader to assign a new score and evaluation, so long as the supervisory grader performs the review in a predetermined time period.

The automated grading system presents an essay response to a grader so that the grader may evaluate the essay response; and presents evaluation categories to the grader so that the grader may select an overall evaluation. The automated grading system enables a grader leader to view the overall evaluation and pre-defined additional comments of the grader and assign a new overall evaluation and pre-defined additional comments if desired.

The evaluation delivery system releases to the examinee for the examinee's retrieval at least one exemplary essay response, the overall evaluation, and the pre-defined additional comments. The evaluation delivery system groups the examination question, scoring guidelines, sample essay responses, the overall evaluation, and pre-defined additional comments into a feedback package; stores the feedback package; and releases the feedback package for retrieval by the examinee.

According to another aspect of the invention there is provided an Internet based system for submitting and evaluating essay responses to examination questions. The system comprises the following elements: a server computer which forwards examination questions to examinees and accepts essay responses to the examination questions for evaluation, the server being connected to the Internet; a first computer connected to the server computer so as to permit examinees to set up an account for purchasing access to an examination question and evaluation of an essay response submitted in response to the examination question; and a second computer connected to the server computer so as to permit graders to read an essay response that was submitted by an examinee, evaluate the essay response by providing an overall comment and pre-defined additional comments, store the overall comment and the pre-defined additional comments, and release the overall comment and the pre-defined additional comments for retrieval by the examinee via the server computer.

According to another aspect of the invention there is provided a method for on-line evaluation of constructed responses to an examination question over a system having a server computer connected to the Internet, a first computer electronically connected to the server computer, and second computer connected to the server computer. The method comprising the following steps: an examinee accessing the server computer from the first computer to set up an account for purchasing access to an examination question and evaluation of an essay response which is submitted in response to the examination question; an examinee accessing the server computer from the first computer to submit an essay response in response to the examination question; accepting the essay responses at the server computer; and a grader accessing the server computer from the second computer to read the essay response submitted by the examinee, evaluate the essay response by providing an overall comment and pre-defined additional comments, storing the overall comment and pre-defined additional comments, and releasing the overall comment and pre-defined additional comments for retrieval by the examinee.

BRIEF DESCRIPTION OF THE DRAWINGS

A full understanding of the invention can be gained from the following description of preferred embodiments when read in conjunction with the accompanying drawings in which:

FIG. 7 illustrates an introductory system screen through which a student or user may access the system's user functionality;

FIG. 8 illustrates a system screen providing directions for using the system of FIG. 1;

FIG. 9 illustrates a system screen which provides fee information for using the system;

FIG. 10 illustrates a system screen which provides sample feedback information similar to that which would be provided upon submission and evaluation of an essay;

FIG. 11 illustrates a system screen which provides the topics for which a user can prepare and submit essays;

FIG. 12 illustrates a system screen which allows a user to order an access code to be used in submitting essays;

FIG. 13 illustrates a system screen which provides information on writing an essay for evaluation;

FIG. 14 illustrates a system screen which allows a user to submit an essay for evaluation;

FIG. 15 illustrates a system screen which allows a user to access feedback regarding an essay;

FIG. 16 illustrates a system screen which allows a user to access responses to frequently asked questions;

FIG. 17 illustrates a system screen which allows a user to access information on the operation of the system;

FIG. 22 illustrates a system screen which a reader may encounter when logging into the system for purposes of scoring essays;

FIG. 23 illustrates a system screen that may be presented to a reader who selects to view a system training pack;

FIG. 24 illustrates a system screen that may be presented to a reader who selects to view the question to which the user's essay is a response;

FIG. 25 illustrates a system screen that may be presented to a reader who selects to view the scoring guidelines;

FIG. 26 illustrates a system screen that may be presented to a reader who has selected to review an essay response that has a particular score associated with it;

FIG. 27 illustrates a system screen that may be presented to a reader who has selected to evaluate an essay; and FIG. 28 illustrates a system screen that may be presented to a reader who has selected to review/assign pre-defined rubrics to an essay response.

DETAILED DESCRIPTION OF PREFERRED EMBODIMENTS

Figure 1:
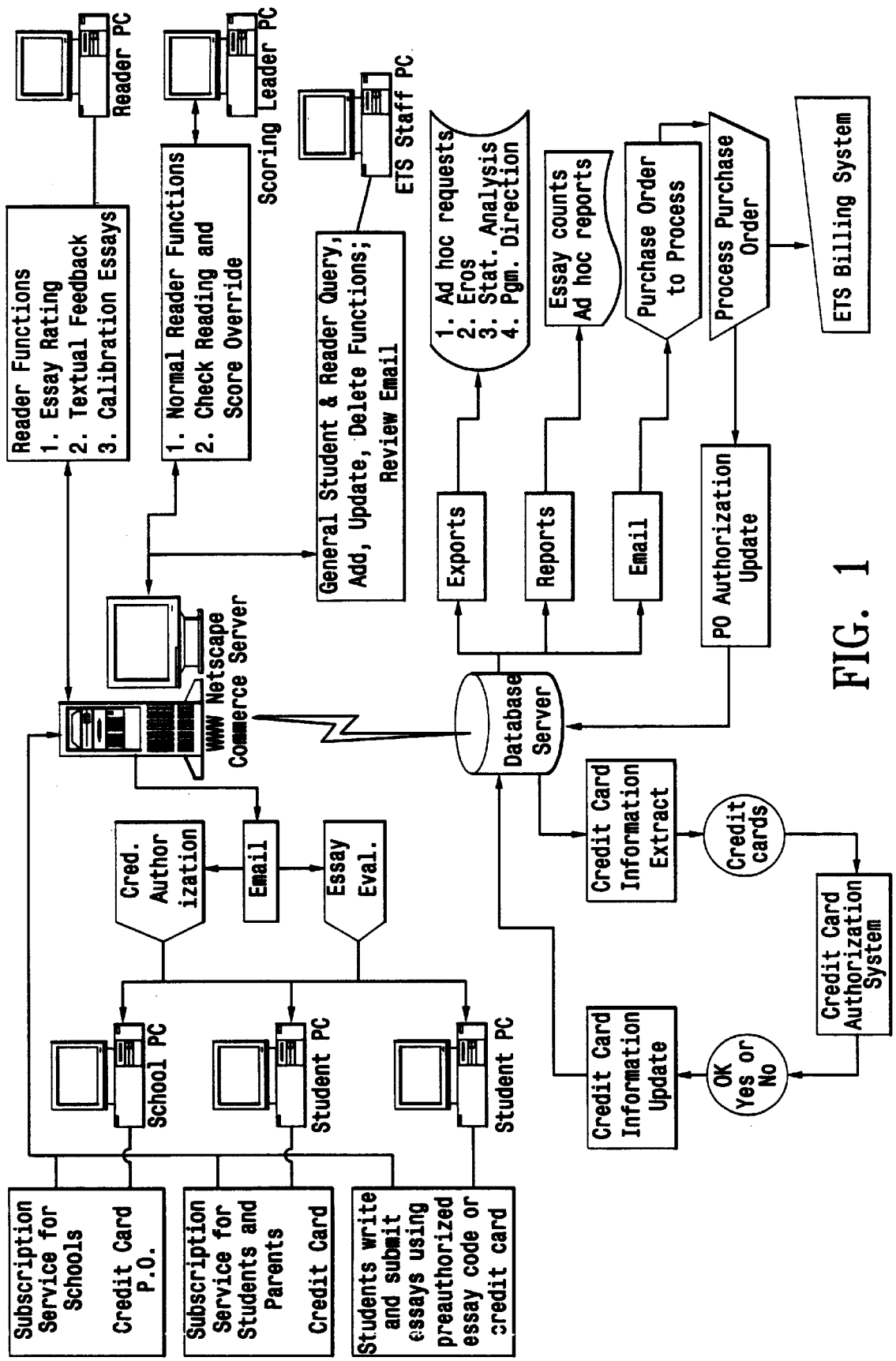
FIG. 1 provides an operational diagram for the essay evaluation system of the invention.

An on-line essay evaluation system with the above-mentioned beneficial features in accordance with a presently preferred exemplary embodiment of the invention will be described below with reference to FIGS. 1 through 28. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

The present system offers students the opportunity to write practice essays, submit the essays to trained, expert readers, and retrieve an evaluation at the student's convenience. The system provides the capability for a user or test taker to submit essays at any time during the year, independent of the timing of an actual testing event. Further, the system provides the capability to prioritize essays and schedule readers so that essays can be evaluated on a rush basis. The essays are evaluated in a manner that provides useful instructional feedback to students about their skills relative to the assessment or test that the student wishes to take.

The present system provides an excellent learning opportunity and is unique in that the essay evaluations may be used for instructional purposes rather than strictly for evaluative purposes. Since the essay scoring and feedback is provided by skilled readers, the evaluation comes from an unbiased source and can prove to be extremely beneficial in helping students develop writing skills and demonstrate content mastery. Further, the system allows for submission of essay responses continuously throughout the year so that a student can improve and prepare for a given test administration. The student receives detailed feedback information which develops the student's knowledge of the subject matter and provides the student with instructional guidance on how to improve his or her writing skills. The student can submit essays in response to the same question several times and obtain feedback each time an essay is submitted. In this way, a user is able to measure improvement. Students can select among the various topics to explore writing techniques applicable to each topic as well as develop their knowledge content in particular topic areas.

Essays are selected for presentation to a reader based on the essay topic and are presented in order by date and time received so that the first essays received are read first. Readers continue to process essays one after the other in the order the system presents the essays to them; readers do not select specific essays to read. Readers can opt to change to other topics for which they are qualified to read, thereby releasing any essays queued for them back into the pool to be presented to other readers.

Readers schedule themselves to perform evaluations on particular reading days. In the preferred embodiment, Monday, Tuesday, Wednesday, Thursday, and Friday are separate reading days for which a reader may schedule himself or herself. The weekend, Saturday and Sunday, is categorized as a single reading day for which a reader may schedule him or herself.

Typically, a primary reader schedules him or herself to evaluate essay responses to a specific question on a specific reading day. The primary reader assumes responsibility for evaluating a certain number of essays, if the essays are available, on selected days. A reader may also schedule him or herself as a backup reader whereby he or she will be available on a particular reading day to read essays if the primary readers are unable to grade all of the essays that are scheduled for reading. Further, selected readers are assigned to be scoring leaders; these highly expert leaders can monitor other readers or themselves serve as a primary reader. A scoring leader reader monitors the scores assigned by primary and backup readers for a specific question on a specific reading day.

An operational diagram for a preferred embodiment of the inventive system is presented in FIG. 1. As shown, a student or user can connect to the on-line essay evaluation system via personal computer 110 or a similar device such as a network computer. A student may connect using either personal account 112 with a credit card or under school account 114. When a user logs into the system, he or she is connected to system server 116. When a user attempts to use a credit card, the credit card information is updated and verified using exterior credit card authorization system 118 accessed via system server 116 and database server 128. It should be noted that when an account is created, it must be identified whether essays that are submitted under that account are to be evaluated on a regular five day schedule or a two day rush schedule. When the user orders the service, the user or student identifies the type of service which is desired, i.e. either standard 5 day turn-around or rush 2 day turn-around. Students select an essay question, fashion a response, and enter the response into the system for evaluation.

Primary readers and backup readers or evaluators also connect to system server 116 via personal computer 119 or similar device. Readers rate the essays submitted by students and provide feedback as explained below.

Scoring leader readers connect to system server 116 via personal computer 120 or equivalent device. Scoring leaders perform normal reader functions and may also check reader work and override a reader where appropriate. Staff of the scoring system service provider can connect to the system via personal computer 121 or similar device to perform system maintenance. Various activities performed by administrative staff such as generating reports 122, exporting data 124, and processing purchase orders 126 require interaction with system database server 128.

Figure 2:
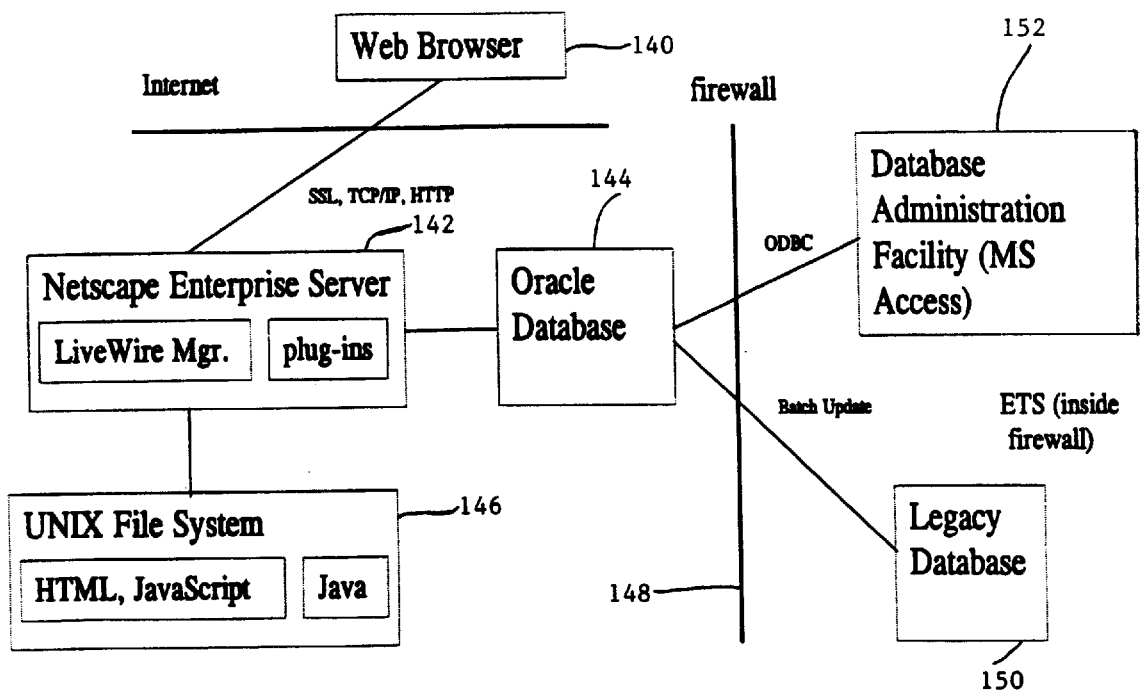
FIG. 2 depicts the architecture of the system of FIG. 1.

A preferred system architecture for an Internet based essay evaluation system is depicted in FIG. 2. As shown, a user may connect to the evaluation system over the Internet or through another network using web browser 140. The server side of the system comprises a web server 142 such as Netscape's Enterprise Server and Oracle database 144 running on a multitasking operating system 146 such as UNIX or Microsoft NT. Firewall 148 protects system resources such as legacy databases 150 and database administrative facilities 152 of the evaluation provider from unauthorized tampering.

Figure 3:
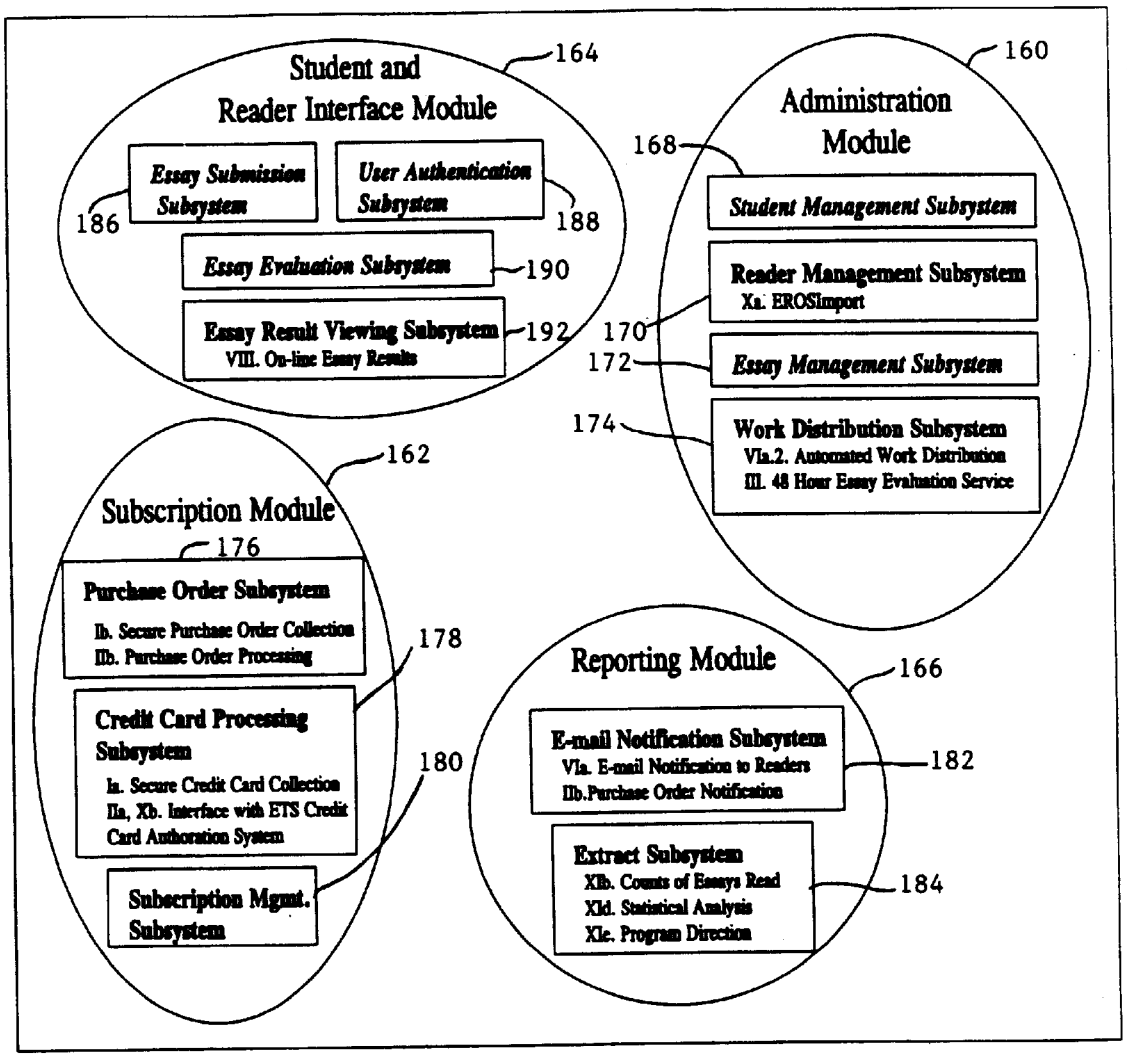
FIG. 3 provides a diagram of the functional components of the system of FIG. 1.

FIG. 3 provides a diagram of the functional components of a preferred embodiment of the system. As shown, the system can be broken into several modules: administration module 160; subscription module 162; student and reader interface module 164; and reporting module 166. The administration module or essay response administrative system 160 comprises several subsystems: student management subsystem 168; reader management subsystem 170; essay management subsystem 172; and work distribution subsystem 174. Subscription module 162 comprises several subsystems: purchase order subsystem 176; credit card processing subsystem 178; and subscription management subsystem 180. Similarly, reporting module 166 comprises several subsystems: e-mail notification subsystem 182; and extract subsystem 184 which allows for sales, reader performance evaluation, and submission summaries. Finally, student and reader interface module 164 comprises several subsystems: submission subsystem or essay response submission system 186; user authentication subsystem 188; essay evaluation subsystem or automated grading system 190; and essay result viewing subsystem or evaluation delivery system 192.

Figure 4B:
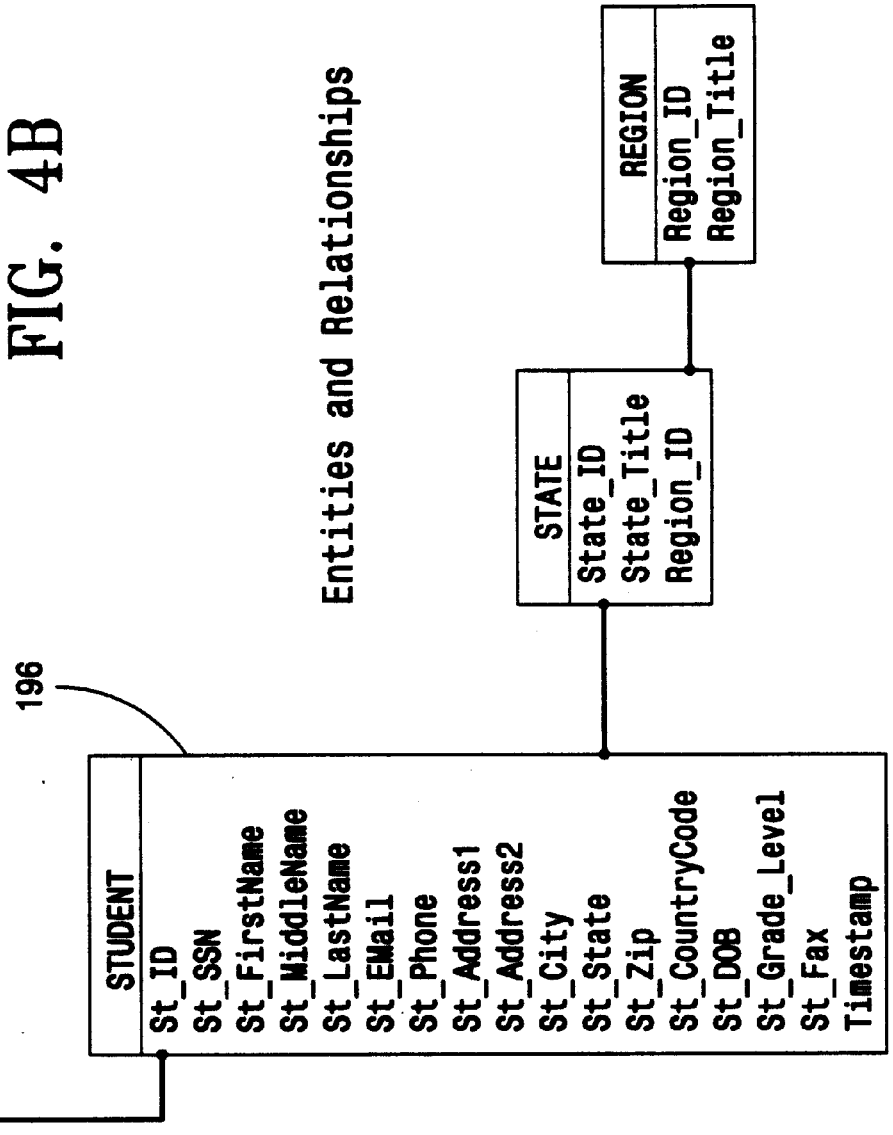
FIG. 4 provides an entity relationship diagram for the system data dictionary.

In the preferred embodiment, the system is implemented with a relational database. Of course, an object oriented database or flat file implementation could be used. FIG. 4 provides a portion of the entity relationship diagram for the database data dictionary. As shown, the database of the present system comprises table 193 in which is stored information regarding essays submitted for scoring. Data related to the question and exam for which a particular question is stored in tables 194 and 195. Information about the students who submit the essays as well as the readers who evaluate the essays are stored in table 196. Likewise, the rubrics and overall evaluation scores are stored in tables 197 and 198. The system provides storage for additional information such as reader scheduling and credit card information (not shown).

Figure 5:
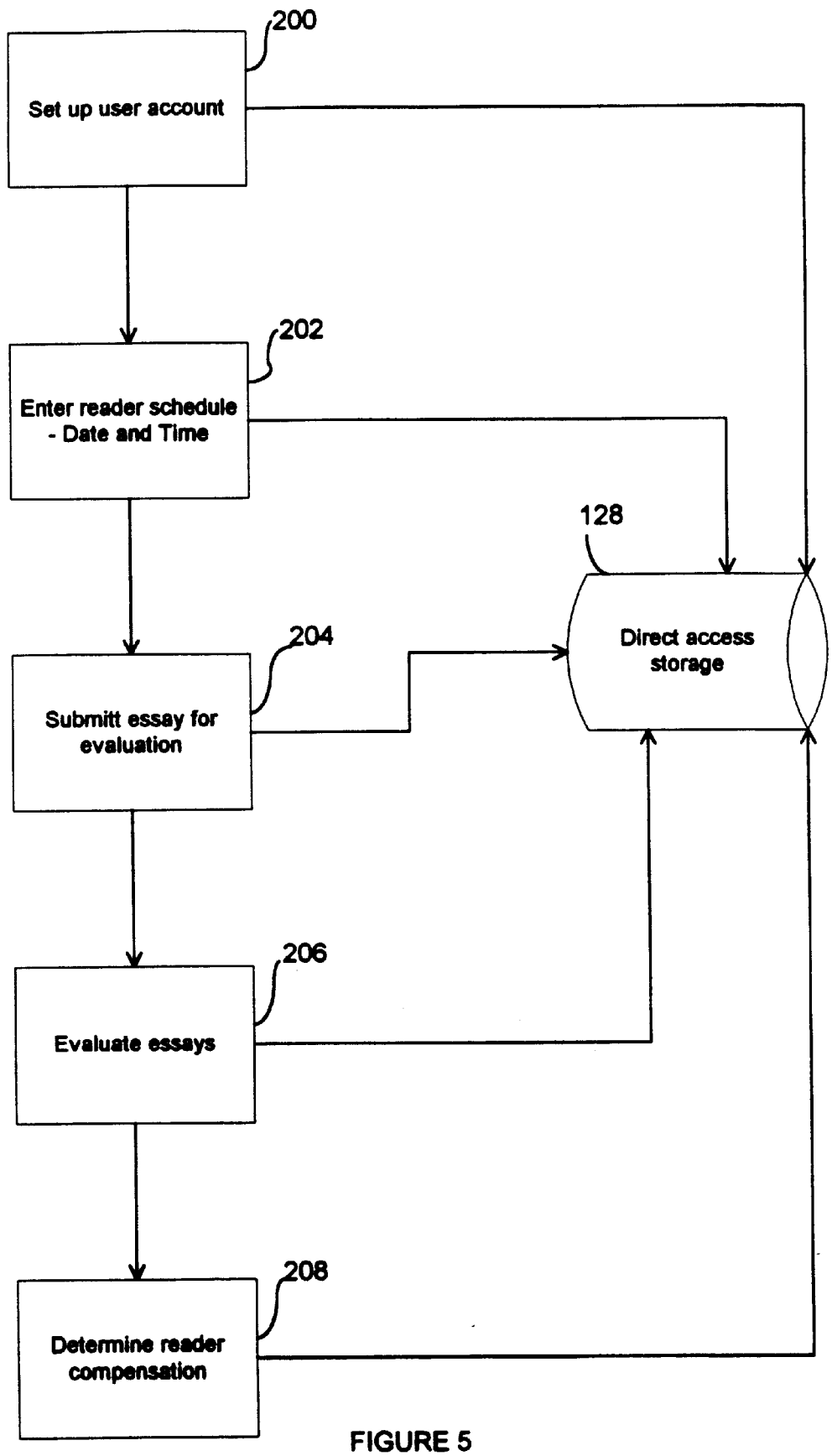
FIG. 5 represents several of the functional operations provided by the system of FIG. 1.

FIG. 5 depicts some of the functional operations provided by the system. As shown, the system provides means 200 for a user or organization such as a school to set up accounts for submitting essays. Times and dates for which readers are scheduled to act as primary readers, backup readers, and reader leaders can also be entered into and retrieved from the system by means 202. Of course, the system provides means 204 to submit essays for evaluation. Readers use means 206 to evaluate essays. Means 208 to compensate readers for their efforts is also provided. As shown, these operations involve updating and accessing information which is stored on system database server 128.

Figure 6:
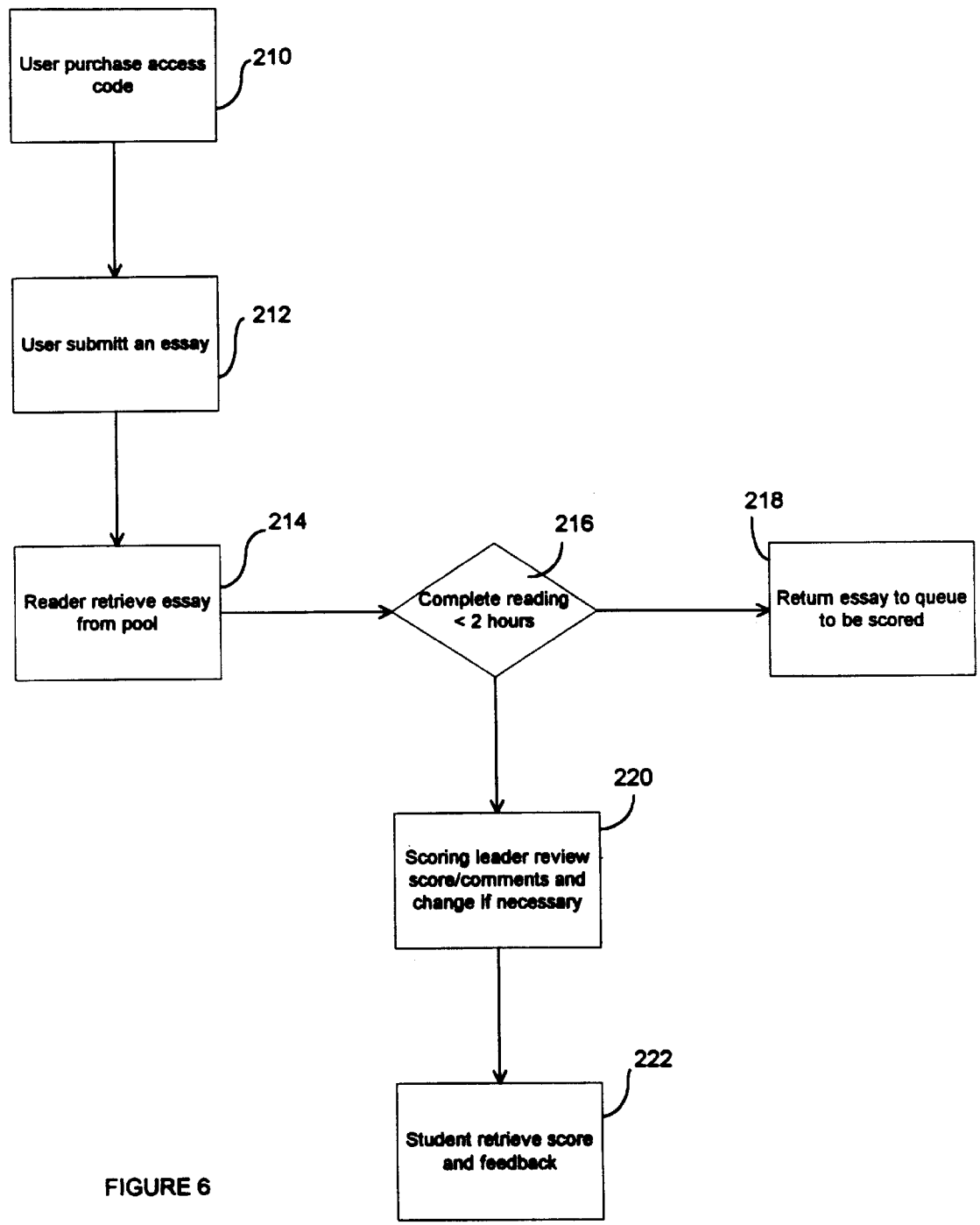
FIG. 6 provides a flowchart of the essay submission and evaluation process provided by the system of FIG. 1.

FIG. 6 provides an overview of the essay submission and evaluation process. At step 210, the student/user purchases an access code. Access codes are purchased for either rush or regular grading. Thus, the access code identifies an essay as one to be scored either on a regular 5 day turnaround or a rush 2 day turnaround. At step 212, the student submits an essay. A primary reader who has signed up for the particular reading day, logs into the system and is presented with a customized list of topics and questions which the reader is qualified to score. An additional icon appears if the reader is also qualified to serve as a scoring leader for the particular question. At step 214, a reader retrieves an essay from the question pool. The reader has two hours in which to read and score the essay. At step 216, if the reader does not submit the essay within two hours, the essay is returned to the pool at step 218 for another reader to evaluate. If at step 216 the reader completes evaluating the essay, the reader can continue scoring essays or can exit the system. After an essay is evaluated, at step 220 a reader leader has a set time frame in which he or she can override the primary or backup reader's assigned score. The time frame for overriding a score is configurable and is preferably set to 15 minutes. The review function may be used to provide critique of a reader. After an essay has been evaluated and the time frame for the reader leader override has expired, a student may retrieve the evaluation and feedback information at step 222. In the preferred embodiment, the student or user may retrieve his or her evaluation only if their account information indicates the bill has been paid.

FIGS. 7 through 17 provide a view of the various screens that a user may encounter while using the system to submit essays. FIG. 7 illustrates an introductory screen through which a user may access the system functionality. As shown, general information regarding the system is provided. The upper left hand side of the screen provides linked lines of text, 230 through 239, which a user may "click on" with a mouse button to access various components of the user interface.

A user can access directions for using the user interface of the system by selecting text line 230. When a user selects line 230, the user is presented with a screen similar to that shown in FIG. 8. A user can access information regarding the fees for using of the system by selecting text line 231. When a user selects line 231, the user is presented with a screen similar to that shown in FIG. 9. A user can sample the type of feedback information that is presented by the system when an essay is submitted by selecting text line 232. When a user selects line 232, the user is presented with a screen similar to that shown in FIG. 10. A user can preview the topics for which he or she can write and submit an essay by selecting text line 233. When a user selects line 233, the user is presented with a screen similar to that shown in FIG. 11. A user can order an access code under which an essay may be submitted by selecting text line 234. When a user selects line 234, the user is presented with a screen similar to that shown in FIG. 12. A user can access information regarding writing an essay for evaluation by selecting text line 235. When a user selects line 235, the user is presented with a screen similar to that shown in FIG. 13. A user can submit an essay for evaluation by selecting text line 236. When a user selects line 236, the user is presented with a screen similar to that shown in FIG. 14. A user can access feedback regarding an essay that he or she previously submitted by selecting text line 237. When a user selects line 237, the user is presented with a screen similar to that shown in FIG. 15. A user can access responses to frequently asked questions about the system by selecting text line 238. When a user selects line 238, the user is presented with a screen similar to that shown in FIG. 16. A user can access help on the system by selecting text line 239. When a user selects line 239, the user is presented with a screen similar to that shown in FIG. 17.

In the preferred embodiment, the on-line essay evaluation system may be accessed over the Internet. Using the above described screens, all of which may be accessed over the Internet with world wide web browser, a user or student is able to order an access code under which he or she may submit an essay or constructed response. Using an access code, a user may access system functionality for submitting essays or constructed responses. After the essay has been evaluated, a user may enter the system to retrieve an evaluation of the essay that he or she submitted. All of this system functionality can be accessed over the world-wide web. Thus, the preferred embodiment is an Internet based on-line essay evaluation system which provides functionality to read an essay question, construct an essay response to the question, submit the essay for evaluation, and retrieve feedback information from experienced, trained readers.

As noted above, the essay evaluation system provides for reader scheduling and prioritization of essay responses so that all essay responses are evaluated within the requested time period. In the preferred embodiment, essays are positioned in the queue by priority of date and time due. Thus, a rush essay which is due before a standard 5 day order essay, is positioned in the queue of essays to be read. The system automatically monitors the number of essays waiting to be read so that all essays are evaluated within the scheduled 48 hour or 5 day turnaround. When the system detects that essays are not being processed fast enough to meet the turnaround commitment, e-mails are automatically sent to the backup readers and to administrative staff. Alternatively, or in addition, a manual process is initiated to call back up readers and to schedule additional readers in order to process the backlog.

Figure 18:
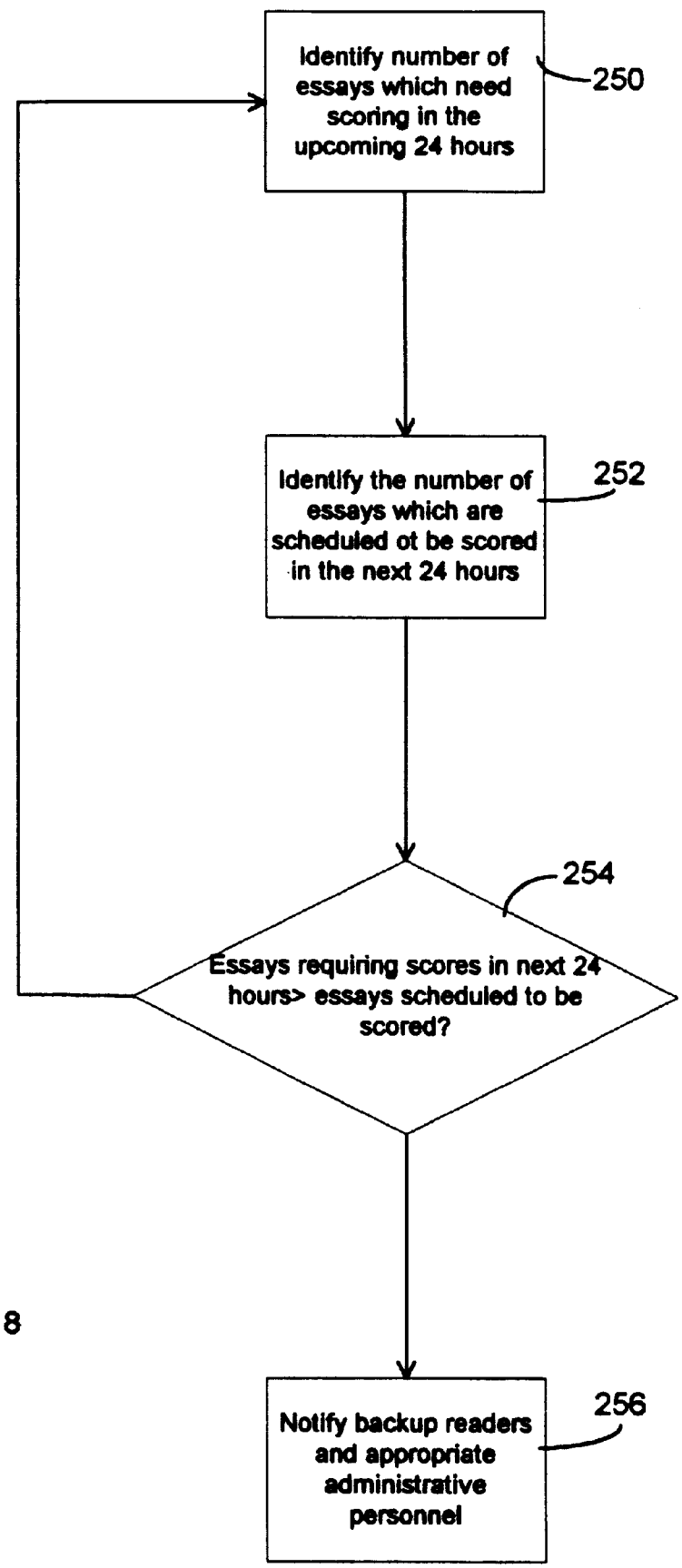
FIG. 18 provides a flow chart of the essay monitoring and reader scheduling process.

A flow chart illustrating the essay monitoring and reader scheduling process is depicted in FIG. 18. At step 250, the number of essays that need to be scored in the upcoming 24 hours in order to satisfy all scoring deadlines is calculated. At step 252, the system searches the database to identify the readers and the total number of each of the various question responses the readers are scheduled to read during the same 24 hours. If at step 254 the number of essays that need to be scored in the up-coming 24 hours is less than the number of essays that are scheduled to be read by scheduled primary readers in the same period, the system returns to step 250 of determining the number of essays to be scored. If at step 254, however, the number of essays that need to be scored in the coming 24 hours is greater than the number of essays that are scheduled to be read by scheduled readers, the system proceeds to step 256 where backup readers and appropriate administrative personnel are notified of the possible shortcoming. In the preferred embodiment, the readers and operators are notified by e-mail. It is then incumbent upon the backup readers and the administrative personnel to insure that the appropriate essays are read so as to meet all time restraints.

To insure smooth operation, the system also automatically performs workload leveling. Workload leveling guards against the situation where the first reader who logs onto the system "ties up" all the essays on a particular topic. Rather, the present system provides essay responses one at a time to readers when an essay is requested by the reader. When the queue of unread essays on a given topic has been exhausted, a message will be displayed indicating that there are no more essays on that topic. The reader then has the option of logging off or, if he or she is qualified to do so, switching to another topic.

Figure 19:
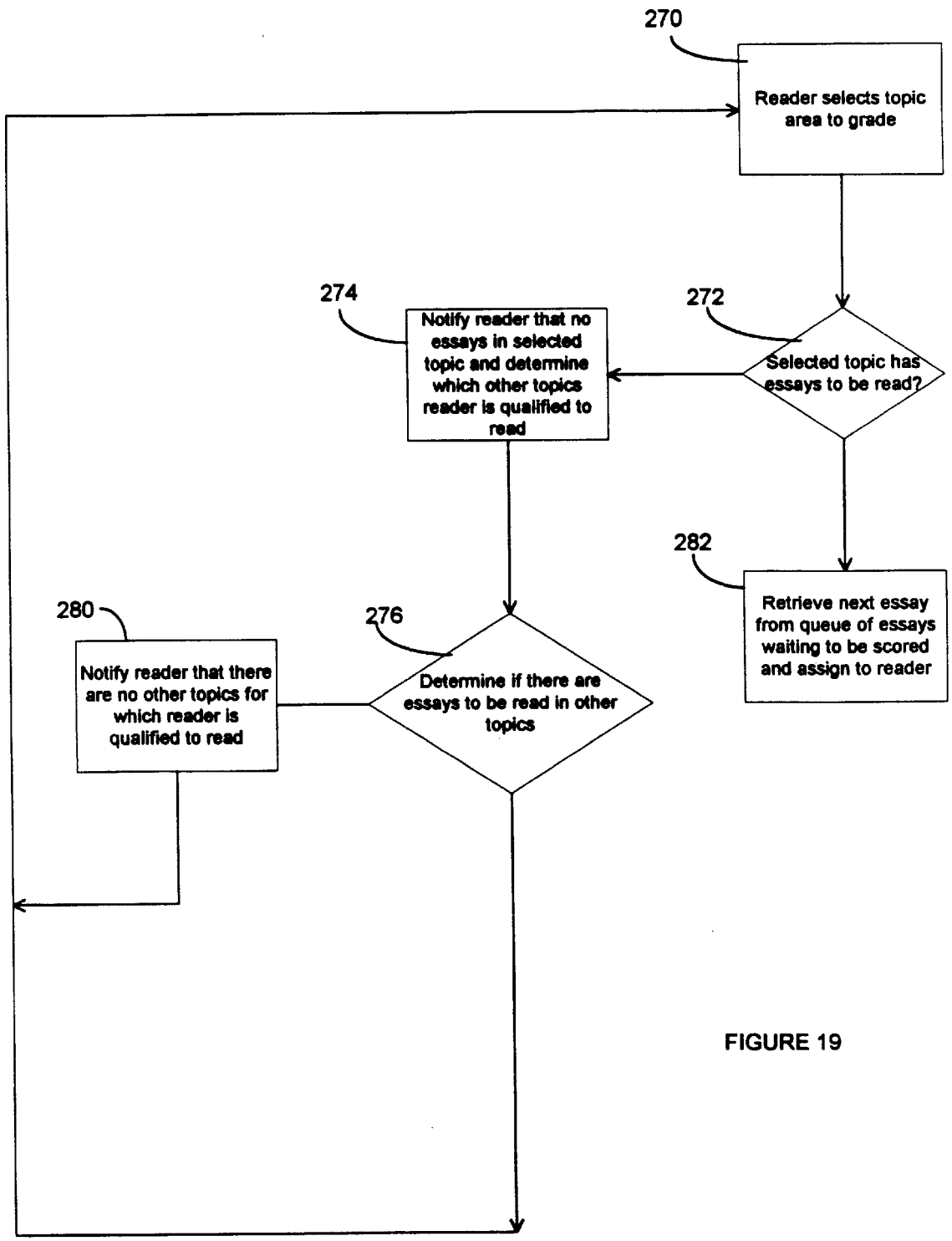
FIG. 19 provides a flow chart of the work load leveling process of the system of FIG. 1.

FIG. 19 depicts the workload leveling process of the present invention. As shown, at step 270, the reader selects a topic area in which to evaluate essays. If at step 272 it is determined that essays for the particular topic and question are available to be scored, the next essay in the queue of essays to be scored is assigned to the particular reader at step 282. If, however, at step 272, it is determined that no essays on the particular topic need to be scored, the system at step 274 notifies the reader of such and determines which other topics the reader is authorized to score. If at step 276 it is determined that other topics which the reader is authorized to score have essays waiting to be read, the reader is allowed to select from the additional topics and essays. However, if at step 276 it is determined that there are no other essays to be read for which the reader is qualified, the system at step 280 notifies the reader of such.

The system also provides for a novel method of compensating readers whereby readers in the present system are compensated for each essay that is read. This in contrast to the traditional reader compensation model whereby readers are paid by the scheduled reading event without regard to the actual number of essays read. A scheduled reading event would be defined as, for example, "the AP reading" which would last for several days each June; in prior systems a participating reader would be compensated for the reading regardless of the number of essays he or she actually read. The compensation method of the present system correlates compensation to work actually performed. Because credit card rejects are so low and to meet time commitments to end users, readers are paid regardless of whether or not the purchase is approved by the credit approval system. The system also provides a means to vary the amount paid for evaluating responses for different examination types or even different questions in the same examination. Quality is ensured by scoring leaders who monitor evaluations and through periodic reviews by statistical analysis of reader performance data.

Figure 20:
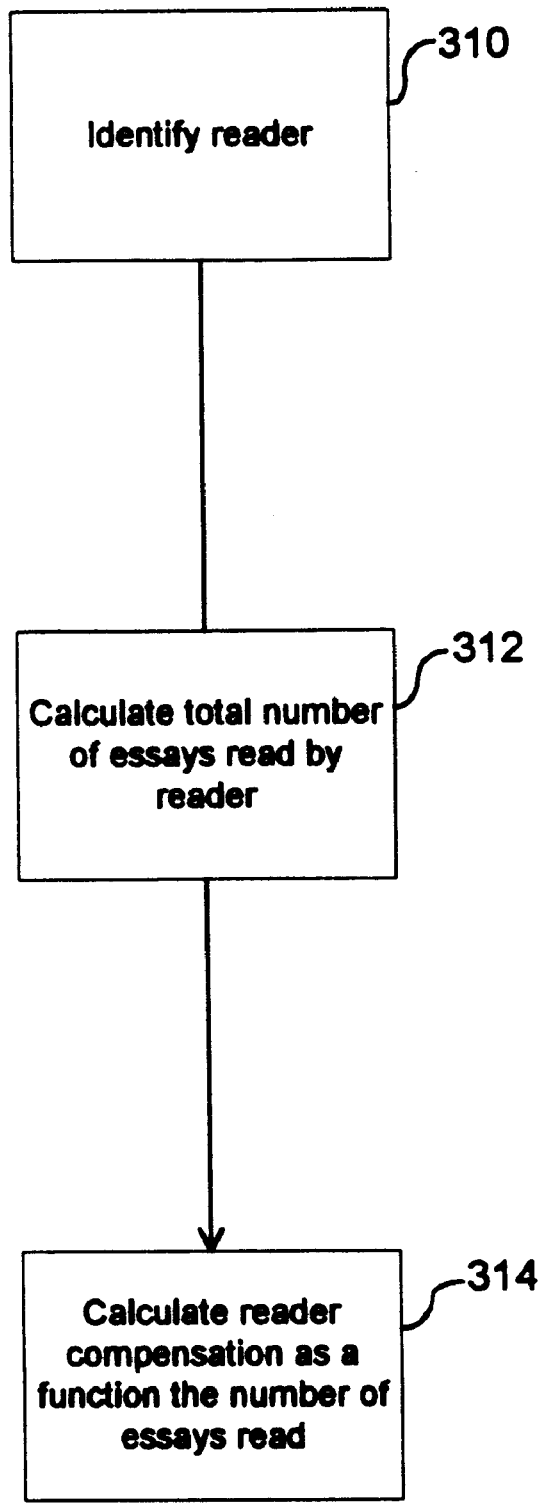
FIG. 20 provides a flow chart of the process for calculating reader compensation in the system of FIG. 1.

FIG. 20 depicts a view of a process for calculating reader compensation. The first step in the process, step 310, involves identifying the particular reader. At step 312 the total number of essays evaluated by the particular reader is accessed, usually in a database where such information is stored. At step 314 the compensation for the particular reader is calculated as a function of the number of essays identified in step 312. In a simple arrangement, the compensation is equal to the number of essays evaluated multiplied by a constant rate. In more complicated embodiments, the rate of compensation may vary by question.

Another novel aspect of the present system is the scoring and feedback functionality. In the present system, a reader selects an overall evaluation comment and an overall score for each essay response. Thereafter, the reader may select various rubrics or feedback bullets which have been pre-stored in the system for the particular question and thereby provide more specific feedback comments regarding the essay. A reader may only choose from the bullets which are provided by the system. In this way the system insures consistent, standardized feedback is provided to users. Readers may choose as many feedback bullets as applicable to the particular essay. The overall evaluation and the particular rubrics that may be selected for a particular evaluation are controlled and may be changed using system functionality. In addition to an overall evaluation and the rubrics, a user receives a copy of the scoring standards and guidelines for the particular question as well as several exemplar essay responses that have received various scores. In the preferred embodiment, the user does not receive the overall score. The overall score is kept in the system for monitoring and reader evaluation.

Figure 21:
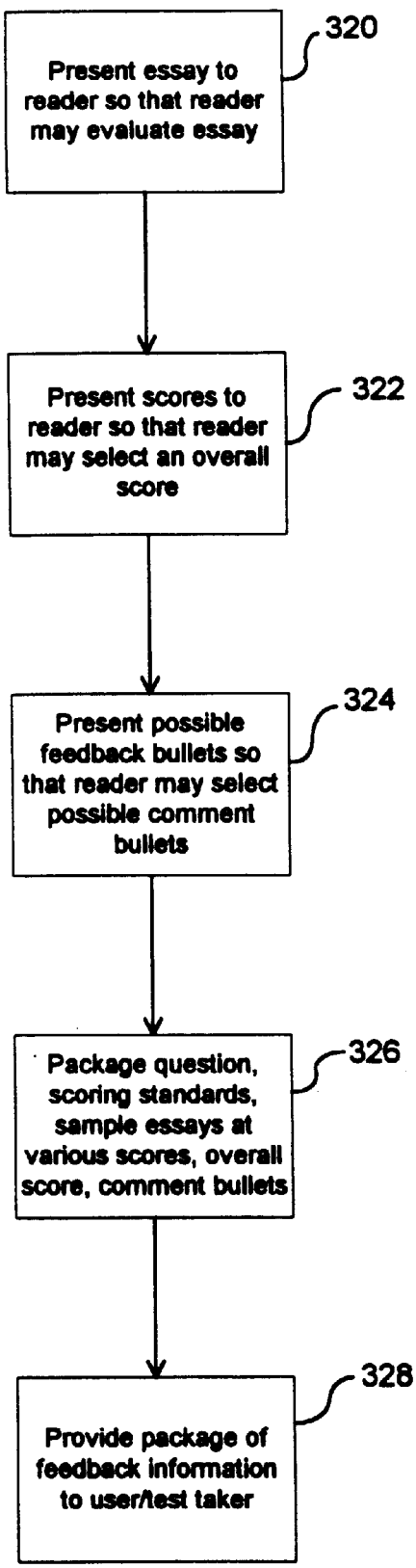
FIG. 21 provides a flow chart of the feedback process of the system of FIG. 1.

FIG. 21 provides a flow chart of the feedback process of the invention. At step 320, the reader is provided with a list of essays to score. The reader selects and evaluates an essay. The reader can reference various information regarding scoring the particular essay such as guidelines for scoring the essay and sample responses with the scores that were assigned to each. At step 322, the reader is provided with a list of overall scores. The reader selects an overall evaluation comment and an overall score for the essay. At step 324, the reader may select from a predefined group of feedback rubrics or bullets. The rubrics associated with a high overall score tend to be positive and point out the positive aspects of the user's essay while the rubrics associated with a low overall score tend to point out the weaknesses in the user's essay and suggest methods of improving. At step 326, the information that will be made available to the user is linked together for convenience and access. The feedback information comprises the following items: the original question; the user's response; the scoring standards or guidelines for the particular question; sample essays that have received various scores; an overall evaluation; and a set of rubrics or feedback bullets. The score assigned by the reader is not provided to the user but is stored for use in research and monitoring readers. The final step 328, involves providing the feedback information to the user. In the preferred embodiment the information is accessed by the user when the user logs onto the testing web site. Alternatively, the information could be transmitted to the user via e-mail or some other means.

FIG. 22 provides an illustrative screen that a reader may encounter when logging into the system for purposes of scoring essays. As shown, the reader is presented with a group of topics from which they may select responses for grading. It should be noted that the reader will be able to access only those topics and related responses for which the reader has been approved. For each question in each topic area, the reader may select to view the training pack, grade the essay, or perform scoring leader functions if qualified.

If the reader selects to view the training pack, the reader will be presented with a screen such as that shown in FIG. 23. At the top of the screen the reader has available several items which may assist in his or her grading of the particular question. The reader may select to review the question that was actually posed to the user by selecting text item 400. The reader might also review the scoring guide by selecting text item 402. Alternatively, the reader may select to review sample essay responses that have been assigned particular scores by clicking on text item 404.

If the reader selects to view the question that was posed to the user, the reader may be presented with a screen similar to that shown at FIG. 24. If the reader selects to view the scoring guideline, the reader may be presented with a screen similar to that shown in FIG. 25. This screen presents information that the reader may find helpful in grading essays. If the reader selects to view a sample essay which has a particular score associated with it, the reader may be presented with a screen similar to that shown in FIG. 26. By reviewing essays that may have been assigned various scores, the reader is able to calibrate him or herself for scoring recently submitted essays.

At the screen shown at FIG. 22, the reader may also select to score an essay. If the reader selects to score the essay, the system may present a screen similar to that shown in FIG. 27. At the top of the screen is displayed the possible scores that may be assigned. The lower portion of the screen displays the essay that is being scored. As shown at the top of the screen, once the reader has assigned a score and rubrics, the reader may submit the score and quit grading or submit the score and continue grading. The reader may also clear any scores that he or she has assigned by pressing the reset button. If the reader wishes, he or she may also select to see a description of the rubrics that correspond to the various overall scores. The screen on which the description of the rubrics is provided may appear similar to that shown in FIG. 28.

The reader functionality described above, like the user functions of the on-line essay evaluation system may be accessed over the Internet. Using the above described screens, all of which may be accessed over the Internet with an Internet browser, a primary reader, backup reader, and reader leader can access essays or constructed response that have been submitted by a user. The reader may proceed to evaluate the essay using the evaluation guidelines and other aides that are described above and provided on-line. A reader may then submit an evaluation of an essay. Thus, the preferred embodiment of the on-line essay evaluation system provides Internet accessible functionality for retrieving an essay response, reviewing information helpful in evaluating the response, assigning an overall evaluation and rubrics to the essay, and submitting an essay evaluation into the system for retrieval by the user or student.

Software for performing the above described processing and presenting the above described screens resides primarily on system server 116 and database server 128. The online-essay evaluation system, however, employs a client server technology. Thus, portions of the system software execute on the personal computers from which users and readers access the system.

Although exemplary embodiments of the invention have been described in detail above, those skilled in the art will readily appreciate that many additional modifications are possible in the exemplary embodiment without materially departing from the novel teachings and advantages of the invention. For example, those skilled in the art will appreciate that the screens employed may vary from those described above. Further, the rate of compensation for readers may vary between questions and test types. Accordingly, all such modifications are intended to be included within the scope of this invention as defined in the following claims.

What is claimed is:

1. A method for on-line evaluation of a constructed response to an examination question, comprising the steps of:

accessing a web site via the Internet, ordering an evaluation account, and selecting an examination question;

an examinee constructing an essay response to said examination question;

electronically submitting said essay response to said web site for evaluation;

positioning the submitted essay response in a queue of essay responses that need to be evaluated by a grader, the essay being placed in the queue based upon at least one of the time of submission of said essay response and the date an evaluation of the essay response is due to the examinee;

the grader evaluating the essay response in accordance with calibrated grading guidelines, selecting an overall evaluation, at least one pre-defined feedback comment, and a score; and releasing for retrieval by the examinee the overall evaluation and the pre-defined feedback comments regarding said essay response.

2. An on-line essay evaluation system for submitting essay responses for evaluation by graders and retrieving an evaluation of the essay response from the grader for submission to the examinee, comprising:

a database which stores a plurality of questions which elicit essay responses from an examinee;

an essay response submission system which selects a question from said database and which submits an essay response to the selected question;

an essay response administrative system which stores essay responses from a plurality of examinees in a queue and selectively distributes the queued essay responses to graders for evaluation;

an automated grading system which enables a grader to evaluate an essay response, to select an overall evaluation, at least one pre-defined additional comment, and a score; and an evaluation delivery system which releases to the examinee for the examinee's retrieval said overall evaluation and any pre-defined additional comments from the grader.

3. The system of claim 2 wherein said essay response administrative system schedules graders to evaluate queued essay responses so that essay responses are evaluated and feedback is stored and released for retrieval by the examinee within a predetermined time period.

4. The system of claim 2 wherein said essay response administrative system prioritizes the presentation and distribution of essay responses to graders so that essay responses are evaluated and feedback is stored and released for retrieval by examinees within a predetermined time period.

5. The system of claim 2 wherein said essay response administrative system automatically calculates any compensation for the graders based upon the number of constructed responses the grader has evaluated.

6. The system of claim 2 wherein said automated grading system enables a grader leader to view the overall evaluation and pre-defined additional comments of the grader and assign a new overall evaluation and pre-defined additional comments if desired.

7. The system of claim 2 wherein said evaluation delivery system releases to the examinee for the examinee's retrieval at least one exemplary essay response, said overall evaluation, and said pre-defined additional comments.

8. The system of claim 2 wherein said essay response administrative system includes software which:

identifies the number of essay responses which need to be evaluated in an upcoming time period;

identifies the number of essay responses which are scheduled to be evaluated in the upcoming time period;

if the number of essay responses that need to be evaluated in the upcoming time period is less than the number of essay responses that are scheduled to be evaluated in the upcoming time period, identifies the number of essay responses which need to be evaluated in the upcoming time period; and if the number of essay responses that need to be evaluated in the upcoming time period is greater than the number of essays that are scheduled to be evaluated in the upcoming time period, electronically notifies backup graders of the need to provide assistance in the upcoming time period.

9. The system of claim 2 wherein said essay response administrative system includes software which:

identifies the date and time an essay response was submitted;

identifies whether the essay response is to be graded on a regular schedule or a rush schedule;

calculates a date for which an evaluation of the essay response is due based upon the date the essay response was submitted and whether the essay response is to be evaluated on a regular schedule or a rush schedule; and places the essay response in a queue of essay responses that is ordered by the date on which an evaluation of each response is due.

10. The system of claim 2 wherein said essay response administrative system includes software which:

identifies a grader;

identifies the total number of essay responses read by the grader; and calculates the compensation for the grader as function of the number of essay responses read.

11. The system of claim 2 wherein said essay response administrative system includes software which:

identifies that a grader has submitted an overall evaluation and score for an essay response;

forwards the essay response and overall evaluation to a grader leader for review; and if the overall evaluation and score are not consistent with scoring and evaluation standards, allows grader leader to assign a new score and evaluation, so long as the supervisory grader performs the review in a predetermined time period.

12. The system of claim 2 wherein said automated grading system presents an essay response to a grader so that the grader may evaluate the essay response; and presents evaluation categories to the grader so that the grader may select an overall evaluation.

13. The system of claim 2 wherein said evaluation delivery system groups the examination question, scoring guidelines, sample essay responses, the overall evaluation, and pre-defined additional comments into a feedback package; stores said feedback package; and releases said feedback package for retrieval by the examinee.

14. An Internet based system for submitting and evaluating essay responses to examination questions, comprising:

a server computer which forwards examination questions to examinees and accepts essay responses to said examination questions for evaluation, said server being connected to the Internet;

a first computer connected to said server computer so as to permit examinees to set up an account for purchasing access to an examination question and evaluation of an essay response submitted in response to said examination question; and a second computer connected to said server computer so as to permit graders to read an essay response that was submitted by an examinee, evaluate the essay response by selecting an overall comment and at least one pre-defined feedback comment, store said overall comment and said at least one re-defined feedback comments, and release said overall comment and said at least one pre-defined feedback comment for retrieval by the examinee via said server computer.

15. A method for on-line evaluation of constructed responses to an examination question over a system having a server computer connected to the Internet, a first computer electronically connected to said server computer, and second computer connected to said server computer, comprising the following steps:

an examinee accessing the server computer from said first computer to set up an account for purchasing access to an examination question and evaluation of an essay response which is submitted in response to said examination question;

an examinee accessing the server computer from said first computer to submit an essay response in response to said examination question;

accepting said essay responses at the server computer; and a grader accessing the server computer from the second computer to read the essay response submitted by the examinee, evaluate the essay response by providing an overall comment and at least one pre-defined feedback comment, storing said overall comment and said at least one pre-defined feedback comment, and releasing said overall comment and said at least one pre-defined feedback comment for retrieval by the examinee.

* * * * *